United States Patent
Gal

(12) 
(10) Patent No.: US 12,373,103 B2
(45) Date of Patent: Jul. 29, 2025

(54) ROUND ROBIN ARBITRATION USING RANDOM ACCESS MEMORY

(71) Applicant: Microsoft Technology Licensing, LLC, Redmond, WA (US)

(72) Inventor: Tama Gal, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 17/948,169

(22) Filed: Sep. 19, 2022

(65) Prior Publication Data

US 2024/0094910 A1    Mar. 21, 2024

(51) Int. Cl.
*G06F 13/00* (2006.01)
*G06F 3/06* (2006.01)

(52) U.S. Cl.
CPC .......... *G06F 3/0611* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 5,524,268 A * | 6/1996 | Geldman | G06F 3/0601 710/52 |
| 5,987,549 A | 11/1999 | Hagersten et al. | |
| 6,625,678 B1 | 9/2003 | Koguchi | |
| 6,829,647 B1 | 12/2004 | Biran et al. | |
| 7,150,021 B1 | 12/2006 | Vajjhala | |
| 7,239,646 B1 | 7/2007 | Sindhu et al. | |
| 8,867,533 B2 | 10/2014 | Machnicki | |
| 10,972,408 B1 * | 4/2021 | Chidambaram Nachiappan | H04L 47/6255 |
| 11,321,248 B2 | 5/2022 | Chachad et al. | |
| 11,443,479 B1 | 9/2022 | Yeung | |
| 2007/0174529 A1 | 7/2007 | Rodriguez et al. | |
| 2011/0296078 A1 * | 12/2011 | Khan | G06F 12/0207 710/244 |
| 2012/0036412 A1 * | 2/2012 | Sugawara | G06F 11/10 714/E11.03 |
| 2013/0019052 A1 * | 1/2013 | Somanache | G06F 13/16 711/E12.008 |
| 2017/0317875 A1 * | 11/2017 | Zeng | H04L 43/10 |
| 2018/0217951 A1 | 8/2018 | Benisty | |

(Continued)

OTHER PUBLICATIONS

Www.wikipedia.com, Random Access Memory, Aug. 2004, p. 1-2 (Year: 2004).*

(Continued)

*Primary Examiner* — Henry Tsai
*Assistant Examiner* — Dean Phan
(74) *Attorney, Agent, or Firm* — Schwegman Lundberg & Woessner, P.A.

(57) ABSTRACT

A circuit performs a method of arbitrating requests between multiple requestors. The method includes accessing, via an arbitration processor, a requestor random access memory (RRAM) having multiple entries. Each entry corresponds to a requestor and includes a valid field indicating whether or not the requestor is requesting. One of the multiple entries is selected in a round robin manner as a function of a value in the valid field indicative of the corresponding requestor requesting. The corresponding requestor requesting arbitration is notified.

19 Claims, 7 Drawing Sheets

(56) References Cited

U.S. PATENT DOCUMENTS

2020/0293366 A1\* 9/2020 Margetts ............... G06F 9/4881
2022/0217073 A1 7/2022 Roweth

OTHER PUBLICATIONS

International Search Report and Written Opinion received for PCT Application No. PCT/US2023/030881, mailed on Dec. 8, 2023, 13 Pages.
International Preliminary Report on Patentability received for PCT Application No. PCT/US23/030881, mailed on Apr. 3, 2025, 06 pages.

\* cited by examiner

ROUND ROBIN ARBITRATION USING RANDOM ACCESS MEMORY

BACKGROUND

Arbitration may be used in many computing scenarios to determine which requestor of multiple requestors may proceed with transactions, such as moving data, requesting access to a shared memory or device, or requesting that data be moved. Some arbitrators are formed from circuitry that is separate from central processing units to help offload the arbitration functions from the central processing units. For limited numbers of requestors, many arbitrators may use registers and combinatorial logic to select a next requestor to proceed. Such arbitrators have difficulty meeting timing requirements for other than a small number of requestors and require significant area to fabricate.

SUMMARY

A circuit performs a method of arbitrating requests between multiple requestors. The method includes accessing, via an arbitration processor, a requestor random access memory (RRAM) having multiple entries. Each entry corresponds to a requestor and includes a valid field indicating whether or not the requestor is requesting. One of the multiple entries is selected in a round robin manner as a function of a value in the valid field indicative of the corresponding requestor requesting. The corresponding requestor requesting arbitration is notified.

DETAILED DESCRIPTION

Figure 1:
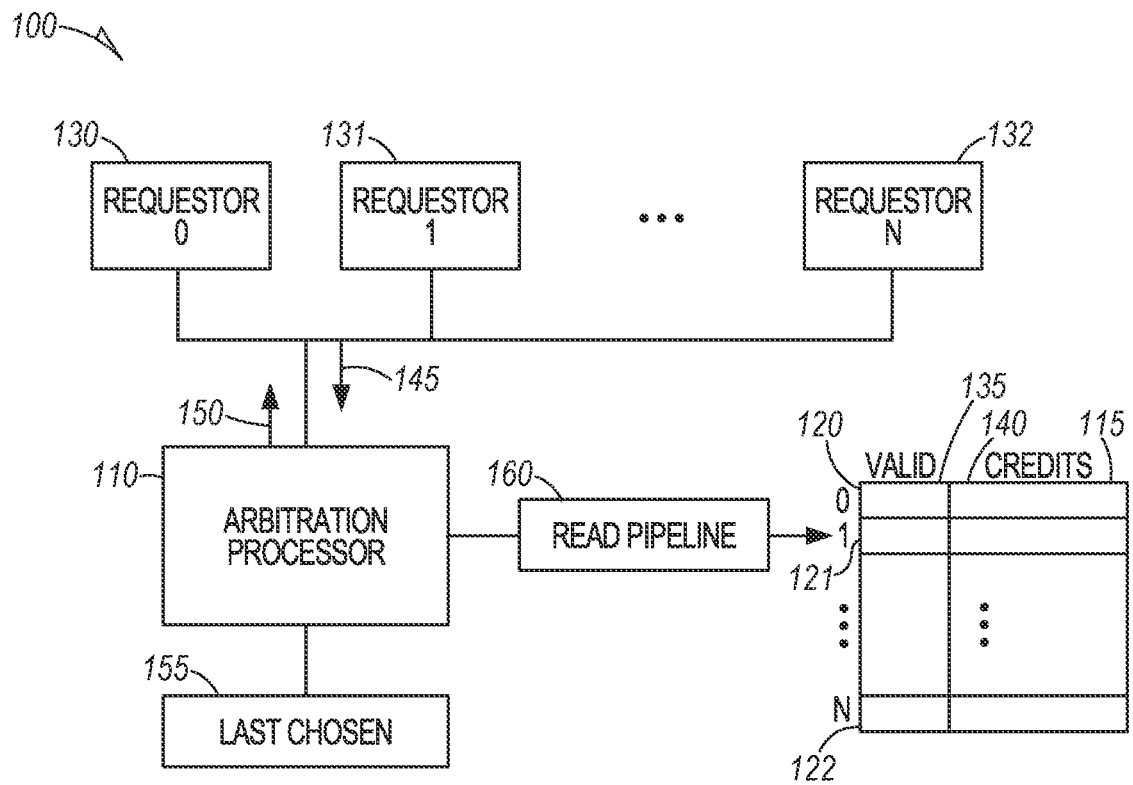
FIG. 1 is a block diagram of an arbitration system according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

An improved arbitration system performs round robin arbitration processing using a random access memory (RAM) having an entry for each arbitration requestor. The RAM may be dedicated to storing the entries in one example. Each entry has a valid field used to indicate whether or not the corresponding requestor is requesting arbitration. Other fields in each entry may include credits that can be checked prior to allowing a requestor to win an arbitration. Such credits can be useful for providing service in accordance with a service level agreement.

Arbitration is done by scanning the RAM and finding the first requestor which has credits and is allowed to win the arbitration. An access pipeline may be used in order to read and receive data every cycle. A last chosen register stores a pointer that points to the last entry for the requestor that won arbitration. A next arbitration cycle starts scanning the ram from a next entry following the pointer.

In one example, multiple-level arbitration may be performed by dividing the entries into logical arbitration groups. The entries for all the arbitration groups are stored in one RAM in one example. For each group there's a start pointer an end pointer, and the last chosen pointer. Group arbitration is first performed at the group level to select a group. Arbitration is then performed on the entries of the group selected to select the winning requester corresponding to the selected entry.

The arbitration system utilizing a RAM can handle many more requestors that prior combinatorial arbiters utilizing registers, which may face timing challenges. Registers are generally faster than RAM at providing data as they are usually located within a central processing unit and are directly accessible by processors. As such, registers are generally limited in number and size and unsuitable for handling large amounts of data.

In one example, the arbitration system utilizing RAM can arbitrate 1,024 or more requestors. The use of the RAM also allows the storage of information related to credits, which can be a significant amount of information that would be problematic to store in prior combinatorial arbiters utilizing registers. To speed RAM based arbitration, the entries may be divided into multiple RAMs that are accessible in parallel, with the entry closest to the last chosen entry selected as the arbitration winner.

FIG. 1 is block diagram of an arbitration system 100. System 100 includes an arbitration processor 110 coupled to access a random access memory (RAM) 115. The arbitration processor may be circuitry or a combination of circuitry and software or firmware configured to perform arbitration using RAM 115.

RAM 115 is configured with a plurality of entries shown at 120, 121, and 122. Each entry corresponds to a requestor shown at 130, 131, 132. A row 0 at 120 corresponds to requestor 0 at 130. Row 1 at 121 corresponds to requestor 131. Row N at 122 corresponds to requestor 132. N may be any number greater than two and may be 1000 or greater in various examples.

Each row in RAM 115 includes a valid field 135 and optionally a credits field 140. The valid field 135 may be a single valid bit in one example. A valid bit of 1 represents the corresponding requestor is requesting arbitration. The valid bit for a requestor may be set to 1 by a requestor sending a set_req+id command at 145 to the arbitration processor 110. The arbitration processor then sets the corresponding valid bit. The id is the corresponding row indicator, such as "0" for setting the valid bit in row 0 at 120. "0" also corresponds to requestor 0 at 130.

Arbitration is done by the arbitration processor 110 scanning the RAM 115 until the first valid entry is found. That entry represents the winner. When an entry gets chosen, the arbitration processor 110 indicates (arb_done+id) at 150 to the requestor that won, and resets the valid bit for the entry. In one example, the requestor may indicate it wants to keep requesting arbitration. Such an indication either sets the valid bit again, or does not reset the valid bit for the requestor. A last chosen register 155 holds an id of the last requestor who won arbitration. The register 155 should have a capacity to identify N values, each value corresponding to one of the requestors. The register 155 may be a stand alone register, a separate RAM, or included in RAM 115 in an area logically separate from the requestor rows. When starting a new arbitration cycle, arbitration processor 110 starts scanning the RAM from an entry_id=last_chosen+1. This scan or search will wrap around the RAM entries in a round robin fashion, and finish at entry_id=last_chosen. Upon reaching an entry with valid=1, the arbitration cycle is done and that entry is selected as the winner. The arbitration may also utilize the credits field 140. The credits field 140 is large enough to hold credit information that identifies whether or not the requestor should be selected in accordance with a specified service level which may be based on a service level agreement. Requestors associated with a higher service level may be selected more often. Requestors having a lower service level may not be selected every time they win a first level of arbitration based on the valid field 135. Credit information may be as simple as keeping a count and decrementing the count each time the requestor wins arbitration. If zero credits remain, the requestor is skipped even if the valid bit is 1. In a further example, a time may be placed in the credit field indicating the next time following which the requester is able to win arbitration based on the first level of arbitration.

A read pipeline 160 may be used to queue reads of the RAM 115 during scanning. The arbitration takes at least num_requestors, N, read cycles. The RAM 115 scan (reads from the RAM) may be pipelined so there's a read every cycle.

Figure 2:
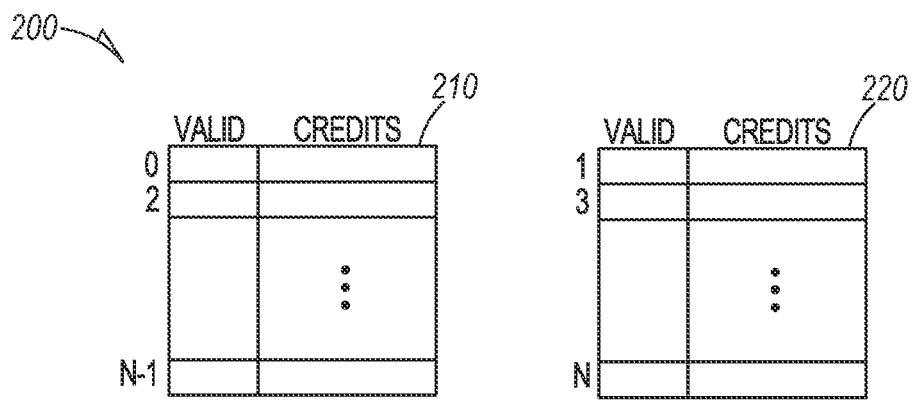
FIG. 2 is a block diagram illustrating a multiple RAM configuration for storing entries for round robin arbitration according to an example embodiment.

FIG. 2 is a block diagram illustrating a multiple RAM configuration 200 for storing entries for round robin arbitration. Entries may be alternated between a first RAM 210 and a second RAM 220. In one example, first RAM 210 includes even entries shown as 0, 2, . . . N−1. Second RAM 220 includes odd entries of 1, 3, . . . N. Arbitration latency can be reduced by half using 2 RAMs, each one holding half the entries. The RAMs are read simultaneously from 1 or 2 more entries than the last chosen entry depending on the RAM. For example, if the last chosen entry was 1 from RAM 220, RAM 210 will be scanned starting from 1+1=2, and RAM 220 will be scanned starting from 1+2=3. If both RAMs return a winner, the actual winner is selected by the distance from the last chosen entry, in this case 1.

In a further example, if one RAM identifies a winner, one or two more memory cycles may be waited before calling that entry the winner and scanning may be stopped. This example assumes that both RAMs are scanned starting at the same time. Since they will be scanning from nearly the same position, a later winner will not be closer to the previous winning entry, the last chosen entry.

Figure 3:
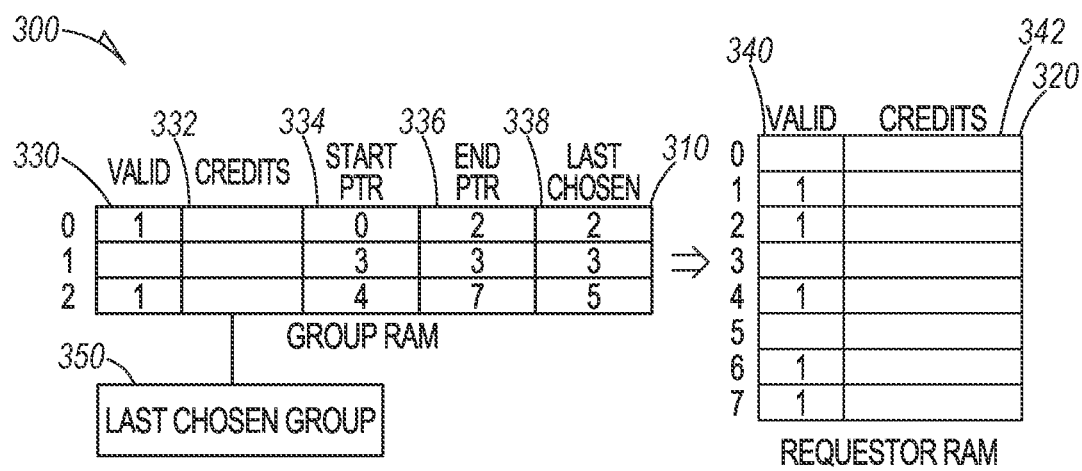
FIG. 3 is a block diagram illustrating multi-level arbitration according to an example embodiment.

FIG. 3 is a block diagram illustrating multi-level arbitration generally at 300. Multi-level arbitration may use a group RAM at 310 and a requestor RAM at 320. With large numbers of requestors, the requestors may be divided into multiple groups. The group RAM 310 is configured with a rows corresponding to the groups. For simplicity, three groups/rows are shown, 0, 1, and 2. The group ram 310 includes multiple fields including a group valid field 330, credits field 332, start pointer 334, end pointer 336, and last chosen field 338.

The requestor RAM 320 includes an entry for each of the requestors, which requestors from a group located in sequential entries. Eight entries are shown to simplify description. The group RAM 310 start pointer 334 and end pointer 336 point to the first and last requestor of the group in the requestor RAM. Requestor RAM 320 entries 0-2 correspond to group 0 in the group ram 310 as indicated by start pointer 0 and end pointer 2. Entry 3 corresponds to group 1, and entries 4-7 correspond to group 2.

Each entry in the requestor RAM 320 includes a valid field 340 and a credits field 342. The credits fields 332 and 342 are optional and operate in a manner similar to that described above. In one example, the grouping may be performed to facilitate management of service level agreements such that groups are selected during arbitration based on a corresponding level of service.

Selected valid bits are shown as set to 1 in both the group RAM 310 and requestor RAM 320 to illustrate operation of multi-level arbitration. In Group RAM 310, both groups 0 and 2 have their valid bit set to 1. In requestor RAM 320, requestors 2, 3, 4, 6, and 7 have their valid bit set to 1.

Arbitration first picks a next group by starting scanning group RAM 310 beginning with a group following a last chosen group as identified in a last chosen register 350. Arbitration occurs in the same manner as described above by utilizing the group valid field 330 and optionally the credits field 332. Upon selection of the group, the start pointer 334 and end pointer 336 are read to determine the bounds of the entries to search in the requestor RAM 320. The last chosen field 338 is read to identify where to start the round robin search of the group entries in the requestor RAM 320. The winner is returned, and valid 340 is updated, along with the last chosen field 338 for the winning entry and last chosen register 350 for the group from which the winner was selected. The group valid field 330 is reset if the chosen requestor is the only requestor in this group with the valid field 340 set.

The requestor RAM 320 may be divided into multiple RAMs utilizing the organization of entries as shown in FIG. 2. If more than two RAMs are utilized, the division of entries between each RAM may be performed in a similar manner. For example, if three RAMs are used, the first RAM may hold entries 0, 3, 6 . . . the second RAM may hold entries 1, 4, 7 . . . and the third may hold entries 2, 5, 8 . . . .

Figure 4:
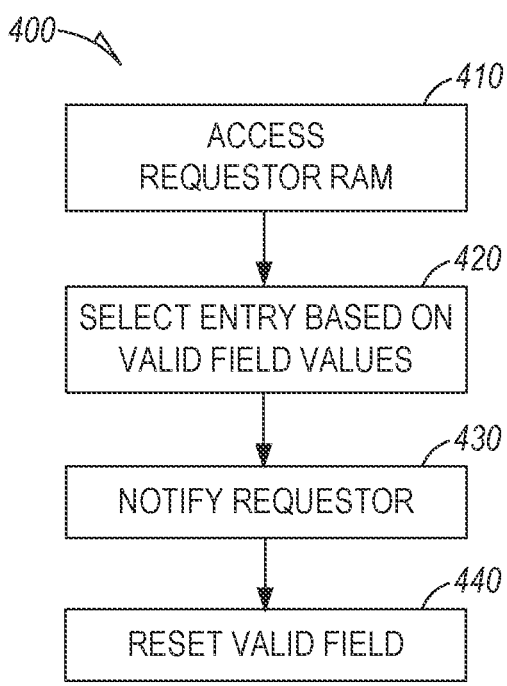
FIG. 4 is a flowchart illustrating a method 400 of arbitrating requests between multiple requestors according to an example embodiment.

FIG. 4 is a flowchart illustrating a method 400 of arbitrating requests between multiple requestors. Method 400 begins at operation 410, by accessing, via an arbitration processor, a requestor random access memory (RRAM) having multiple entries, each entry corresponding to a requestor and including a valid field indicating whether or not the requestor is requesting. One of the multiple entries is selected at operation 420 in a round robin manner as a function of a value in the valid field indicative of the corresponding requestor requesting. The corresponding requestor requesting will be notified at operation 430 that it won the arbitration. At operation 440 the valid field of the one of the multiple entries is reset following the selecting of the one of the multiple entries.

Figure 5:
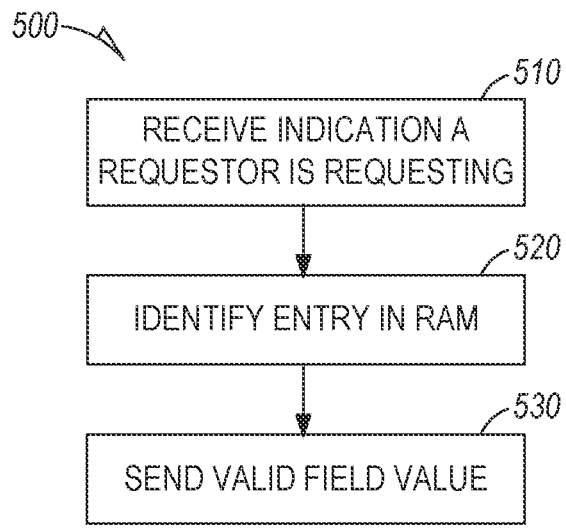
FIG. 5 is a flowchart illustrating a method 500 of modifying an entry to indicate that a requestor is requesting arbitration according to an example embodiment.

FIG. 5 is a flowchart illustrating a method 500 of modifying an entry to indicate that a requestor is requesting arbitration. At operation 510, an indication is received that a requestor is requesting arbitration. An entry in the RRAM corresponding to the requestor that is requesting arbitration is identified at operation 520. At operation 530, a corresponding valid field in the corresponding entry in the RRAM is set to indicate the requestor is requesting.

In one example, accessing the RRAM is performed in a pipelined manner to enable a read every of an entry every arbitration processor clock cycle. In a further example, the RRAM comprises two RAMs, each of the two RAMs that are accessed in parallel, with entries divided between the two RAMs, and wherein the one of the multiple entries is selected as a function of a distance from a last chosen entry.

Figure 6:
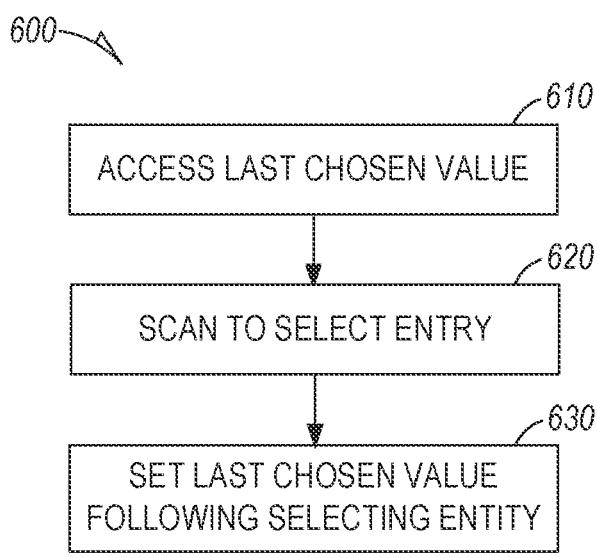
FIG. 6 is a flowchart illustrating a method 600 of scanning the RAM for a winner of the arbitration according to an example embodiment.

FIG. 6 is a flowchart illustrating a method 600 of scanning the RRAM for a winner of the arbitration. Method 600 begins at operation 610 by accessing a last chosen value to obtain a starting point for selecting one of the multiple entries in the round robin manner. The RRAM is scanned at operation 620 to select one of the multiple entries in a round robin manner. Operation 630 sets the last chosen value to indicate a next starting point for a next arbitration. The indication may be the id of the last winning entry, indicating that the next entry is the next starting point or may be the actual id of the next starting point in various examples.

Figure 7:
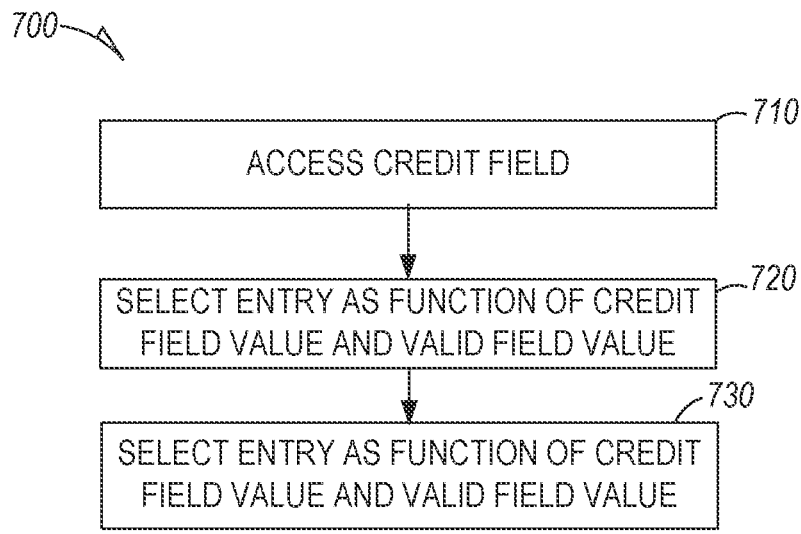
FIG. 7 is a flowchart illustrating a method 700 of selecting one of the multiple entries in a round robin manner according to an example embodiment.

FIG. 7 is a flowchart illustrating a method 700 of selecting one of the multiple entries in a round robin manner. Method 700 begins at operation 710 by accessing a credit field for entries. The one of the multiple entries is selected as a function of a credit value in the corresponding credit field in addition to the value in the valid field.

Figure 8:
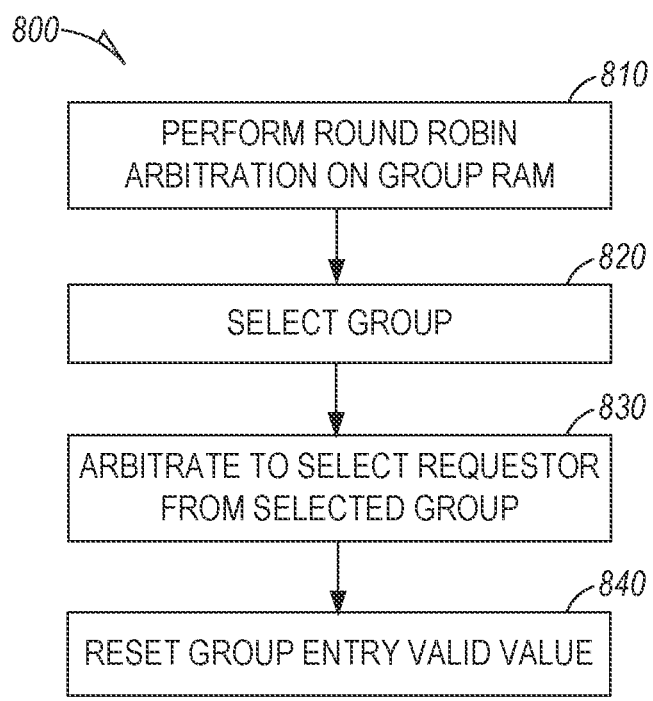
FIG. 8 is a flowchart illustrating a method 800 of performing multi-level arbitration to select a winning entry according to an example embodiment.

FIG. 8 is a flowchart illustrating a method 800 of performing multi-level arbitration to select a winning entry. Method 800 may be performed before method 400 and begins by at operation 810 by performing round robin arbitration using a group RAM having multiple group entries, each group entry corresponding to a group of requestors and including a valid field indicating whether or not the group of requestors is requesting, a start pointer to a corresponding RRAM, an end pointer to the corresponding RRAM, and a last chosen pointer.

The one of the multiple entries in the group RAM is selected at operation 820 in a round robin manner as a function of a value in the valid field indicative of the corresponding group of requestors requesting. Selecting the one of the multiple entries in the group RAM may be done by accessing a group last chosen value to obtain a starting point for selecting one of the groups of requestors in the round robin manner and upon selecting one of the multiple entries in the round robin manner, setting the last chosen value to indicate a next starting point.

Following selection of the entry corresponding to the group of requestors, the elements of method 400 are performed on a portion of the RRAM containing entries corresponding to the selected group of requestors to select the winning entry corresponding to a winning requestor. At operation 830, the group valid field of the one of the multiple group entries following the selecting of the one of the groups is reset if the winning requestor is the only requestor in the group that was requesting.

Figure 9:
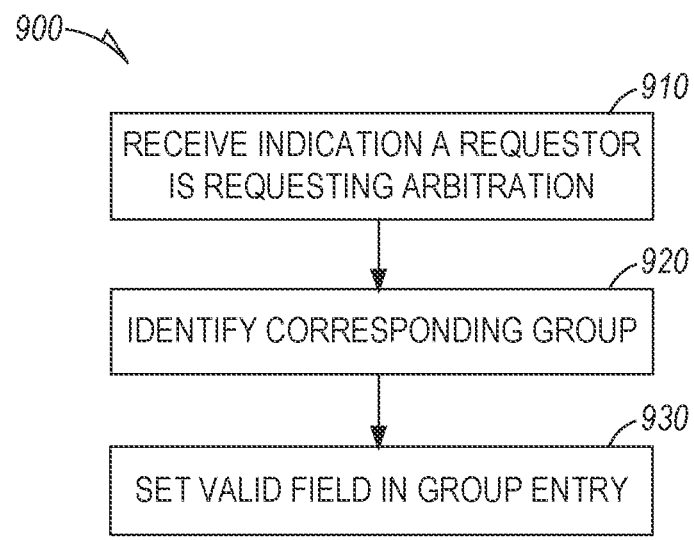
FIG. 9 is a flowchart illustrating a method 900 of managing indications that a requestor is requesting arbitration in a multi-level arbitrator according to an example embodiment.

FIG. 9 is a flowchart illustrating a method 900 of managing indications that a requestor is requesting arbitration in a multi-level arbitrator. Method 900 begins at operation 910 by receiving an indication that a requestor is requesting. A group entry in the group RAM corresponding to the requestor that is requesting is identified at operation 920. Operation 930 sets a corresponding valid field in a corresponding group entry, if not already set, to indicate a requestor in the group is requesting.

Figure 10:
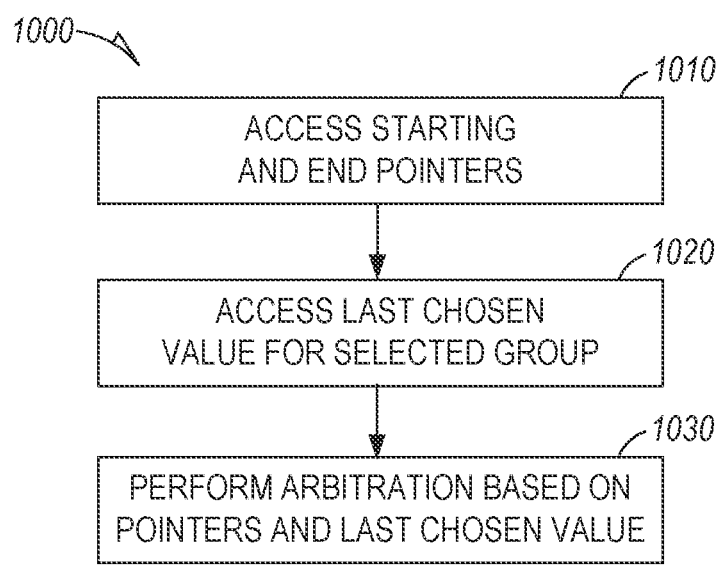
FIG. 10 is a flowchart illustrating a method 1000 of starting arbitration within an already selected group in a multi-level arbitration in a round robin manner according to an example embodiment.

FIG. 10 is a flowchart illustrating a method 1000 of starting arbitration within an already selected group in a multi-level arbitration in a round robin manner according to an example embodiment. Method 1000 begins at operation 1010 by accessing a RRAM starting pointer and end pointer for the selected group. Method 1000 continues at operation 1020 by accessing a RRAM last chosen value for the selected group. The round robin arbitration is performed at operation 1030 on entries in the RRAM corresponding to the starting pointer, end pointer, and last chosen value.

Figure 11:
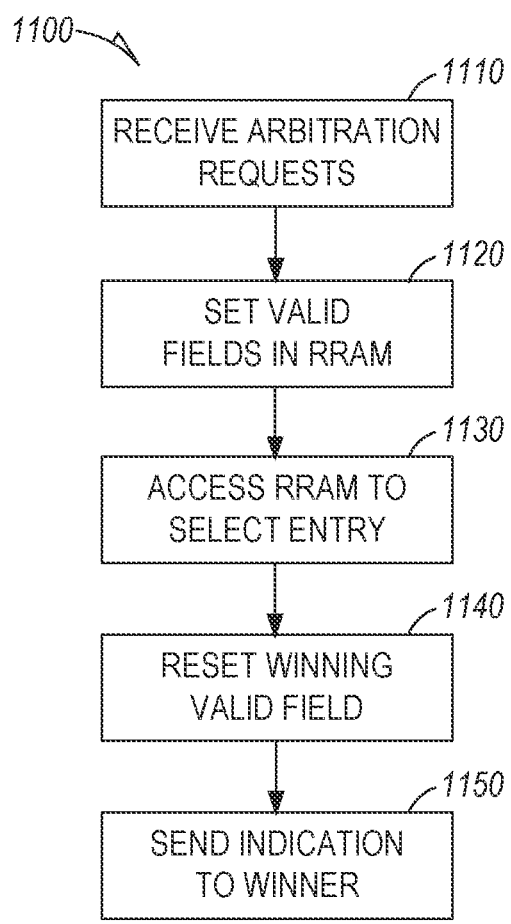
FIG. 11 is a flowchart illustrating a method 1100 of performing arbitration according to an example embodiment.

FIG. 11 is a flowchart illustrating a method 1100 of performing arbitration. Method 1100 begins at operation 1110 by receiving arbitration requests at an arbitration processor from multiple requestors. Set valid field requests are sent at operation 1120 to a requestor random access memory (RRAM) having multiple entries, each entry corresponding to a requestor and including a valid field. The RRAM is accessed at operation 1130 to select one of the multiple entries in a round robin manner as a function of a value in the valid field indicative of the corresponding requestor requesting. Operation 1140 resets the value in the valid field of the selected one of the multiple entries. An arbitration done indication is sent at operation 1150 to the corresponding requestor requesting to inform the winner of the arbitration.

Figure 12:
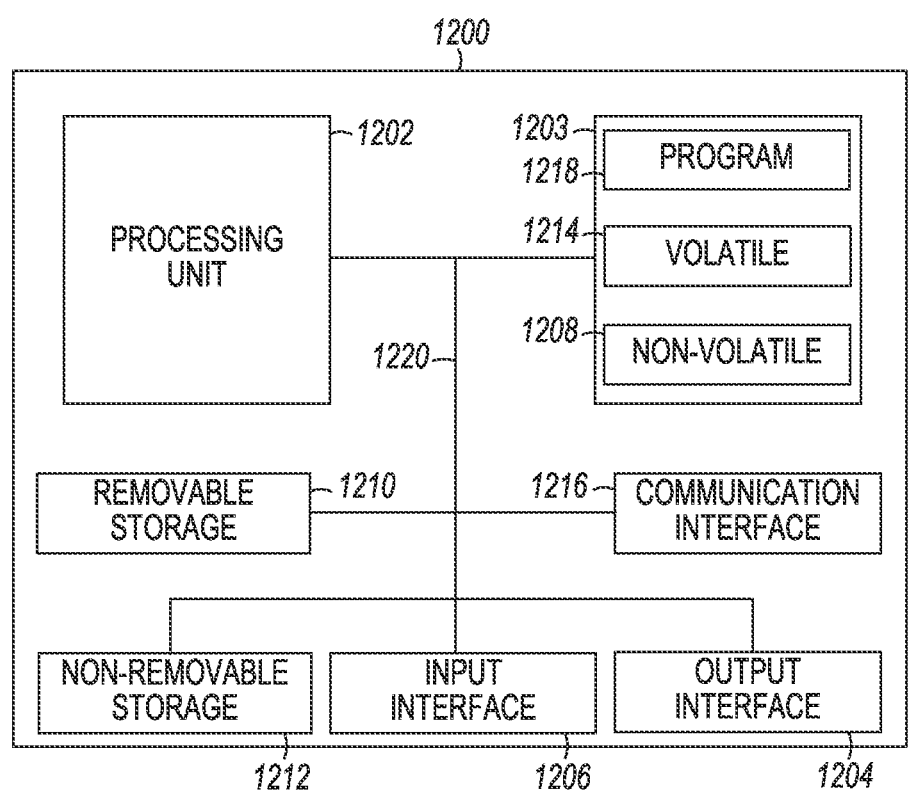
FIG. 12 is a block schematic diagram of a computer system to implement one or more example embodiments.

FIG. 12 is a block schematic diagram of a computer 1200 to perform round robin arbitration using RAM for storing requestor entries and for performing methods and algorithms according to example embodiments. All components need not be used in various embodiments. In particular, FPGAs may be used to implement arbitration circuitry in further examples to perform the methods and algorithms in conjunction with one or more RAMs.

One example computing device in the form of a computer 1200 may include a processing unit 1202, memory 1203, removable storage 1210, and non-removable storage 1212. Although the example computing device is illustrated and described as computer 1200, the computing device may be in different forms in different embodiments. For example, the computing device may instead be a smartphone, a tablet, smartwatch, smart storage device (SSD), or other computing device including the same or similar elements as illustrated and described with regard to FIG. 12. Devices, such as smartphones, tablets, and smartwatches, are generally collectively referred to as mobile devices or user equipment.

Although the various data storage elements are illustrated as part of the computer 1200, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1203 may include volatile memory 1214 and non-volatile memory 1208. Computer 1200 may include—or have access to a computing environment that includes—a variety of computer-readable media, such as volatile memory 1214 and non-volatile memory 1208, removable storage 1210 and non-removable storage 1212. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1200 may include or have access to a computing environment that includes input interface 1206, output interface 1204, and a communication interface 1216. Output interface 1204 may include a display device, such as a touchscreen, that also may serve as an input device. The input interface 1206 may include one or more of a touchscreen, touchpad, mouse, keyboard, camera, one or more device-specific buttons, one or more sensors integrated within or coupled via wired or wireless data connections to the computer 1200, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1200 are connected with a system bus 1220.

Computer-readable instructions stored on a computer-readable medium are executable by the processing unit 1202 of the computer 1200, such as a program 1218. The program 1218 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 1218 along with the workspace manager 1222 may be used to cause processing unit 1202 to perform one or more methods or algorithms described herein.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof, such as field programmable gate arrays. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term. "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

EXAMPLES

1. A method of arbitrating requests between multiple requestors includes accessing, via an arbitration processor, a requestor random access memory (RRAM) having multiple entries, each entry corresponding to a requestor and including a valid field indicating whether or not the requestor is requesting, selecting one of the multiple entries in a round robin manner as a function of a value in the valid field indicative of the corresponding requestor requesting, and notify the corresponding requestor requesting arbitration.
2. The method of example 1 and further comprising resetting the valid field of the one of the multiple entries following the selecting of the one of the multiple entries.
3. The method of any of examples 1-2 and further including receiving an indication that a requestor is requesting, identifying an entry in the RRAM corresponding to the requestor that is requesting, and setting the valid field in a corresponding entry to indicate the requestor is requesting.
4. The method of any of examples 1-3 wherein accessing the RRAM includes accessing a last chosen value to obtain a starting point for selecting one of the multiple entries in the round robin manner and upon selecting one of the multiple entries in a round robin manner, setting the last chosen value to indicate a next starting point.
5. The method of any of examples 1-4 wherein selecting one of the multiple entries in a round robin manner further includes accessing a credit field for entries and selecting the one of the multiple entries as a function of a credit value in the corresponding credit field in addition to the value in the valid field.
6. The method of any of examples 1-5 wherein accessing the RRAM is performed in a pipelined manner to enable a read every of an entry every arbitration processor clock cycle.
7. The method of any of examples 1-6 wherein the RRAM comprises two RAMs, each of the two RAMs that are accessed in parallel, with entries divided between the two RAMs, and wherein the one of the multiple entries is selected as a function of a distance from a last chosen entry.
8. The method of any of examples 1-7 and further including first, performing round robin arbitration using a group RAM having multiple group entries, each group entry corresponding to a group of requestors and including a group valid field indicating whether or not the group of requestors is requesting, a start pointer to a corresponding RRAM, an end pointer to the corresponding RRAM, and a last chosen pointer, selecting one of the multiple entries in the group RAM in a round robin manner as a function of a value in the group valid field indicative of the corresponding group of requestors requesting, and second, performing the elements of example 1 on a portion of the RRAM containing entries corresponding to the selected group of requestors.
9. The method of example 8 and further including resetting the group valid field of the one of the multiple group entries following the selecting of the one of the groups provided no other requestors in the group is requesting.
10. The method of any of examples 8-9 and further including receiving an indication that a requestor is requesting, identifying a group entry in the group RAM corresponding to the requestor that is requesting, and setting a corresponding group valid field in a corresponding group entry to indicate a requestor in the group is requesting.
11. The method of any of examples 8-10 wherein selecting one of the multiple entries in the group RAM includes accessing a group last chosen value to obtain a starting point for selecting one of the groups of requestors in the round robin manner and upon selecting one of the multiple entries in the round robin manner, setting the last chosen value to indicate a next starting point.
12. The method of any of examples 8-11 wherein selecting one of the groups in a round robin manner further includes accessing a RRAM starting pointer and end pointer for the selected group, accessing a RRAM last chosen value for the selected group, and performing the round robin arbitration on entries in the RRAM corresponding to the starting pointer, end pointer, and last chosen value.
13. The method of any of examples 1-12 wherein the RRAM is a dedicated RAM.
14. An arbitration system includes a requestor random access memory having multiple entries, each entry corresponding to a requestor and including a valid field indicating whether or not the requestor is requesting, and arbitration circuitry configured to receive requests for arbitration between the multiple requestors, access the requestor random access memory to select one of the multiple entries in a round robin manner as a function of a value in the valid field indicative of the corresponding requestor requesting, and send an indication to the corresponding requesting requestor.
15. The system of example 14 wherein the arbitration is further configured to reset the valid field of the one of the multiple entries following the selecting of the one of the multiple entries.
16. The system of any of examples 14-15 wherein the arbitration circuitry is further configured to receive an indication that a requestor is requesting, identify an entry in the requestor random access memory corresponding to the requestor that is requesting, and setting a corresponding valid field in a corresponding entry to indicate the requestor is requesting.
17. The system of any of examples 14-16 and further including a last chosen register accessible by the arbitration circuitry and wherein arbitration circuitry is configured to access the requestor random access memory by accessing the last chosen register to obtain a starting point for selecting one of the multiple entries in the round robin manner, and upon selecting one of the multiple entries in a round robin manner, setting the last chosen register to indicate a next starting point.
18. The system of any of examples 14-17 wherein the arbitration circuitry is further configured to select one of the multiple entries in a round robin manner by accessing a credit field for each entry and selecting the one of the multiple entries as a function of a credit value in the corresponding credit field in addition to the value in the valid field.
19. The system of any of examples 14-18 wherein the arbitration circuitry is further configured to access the random access memory in a pipelined manner to enable a read every of an entry every arbitration processor clock cycle.
20. A method including receiving arbitration requests at an arbitration processor from multiple requestors, sending set valid field requests to a requestor random access memory (RRAM) having multiple entries, each entry corresponding to a requestor and including a valid field, accessing the RRAM to select one of the multiple entries in a round robin manner as a function of a value in the valid field indicative of the corresponding requestor requesting, resetting the value in the valid field of the selected one of the multiple entries, and sending an arbitration done indication to the corresponding requestor requesting.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:
1. A method of arbitrating requests between multiple requestors, the method comprising:
  performing round robin arbitration using a group RAM having multiple group entries, each group entry corresponding to a group of requestors and including a group valid field indicating whether or not the group of requestors is requesting, a start pointer to a corresponding requestor random access memory (RRAM), an end pointer to the corresponding RRAM, and a last chosen pointer;

selecting one of the multiple entries in the group RAM in a round robin manner as a function of a value in the group valid field indicative of the corresponding group of requestors requesting;

accessing, via an arbitration processor, a portion of the RRAM containing the corresponding group of requestors and having multiple entries, each entry corresponding to a requestor and including a valid field indicating whether or not the requestor is requesting;

selecting one of the multiple entries in a round robin manner as a function of a value in the valid field indicative of the corresponding requestor requesting; and notifying the corresponding requestor requesting arbitration.

2. The method of claim 1 and further comprising resetting the valid field of the one of the multiple entries following the selecting of the one of the multiple entries and wherein selecting one of the multiple entries is based on a last chosen value indication accessed from a last chosen value register.

3. The method of claim 1 and further comprising:
receiving an indication that a requestor is requesting;
identifying an entry in the RRAM corresponding to the requestor that is requesting; and
setting the valid field in a corresponding entry to indicate the requestor is requesting.

4. The method of claim 1 wherein accessing the RRAM comprises:
accessing a last chosen value to obtain a starting point for selecting one of the multiple entries in the round robin manner; and
upon selecting one of the multiple entries in a round robin manner, setting the last chosen value to indicate a next starting point.

5. The method of claim 1 wherein selecting one of the multiple entries in a round robin manner further comprises:
accessing a credit field for entries; and
selecting the one of the multiple entries as a function of a credit value in athe corresponding credit field in addition to the value in the valid field.

6. The method of claim 1 wherein accessing the RRAM is performed in a pipelined manner to enable a read of an entry every arbitration processor clock cycle.

7. The method of claim 1 wherein the RRAM comprises two RAMs, each of the two RAMs that are accessed in parallel, with entries divided between the two RAMs, and wherein the one of the multiple entries is selected as a function of a distance from a last chosen entry.

8. The method of claim 1 and further comprising resetting the group valid field of the one of the multiple group entries following the selecting of the one of the groups.

9. The method of claim 1 and further comprising:
receiving an indication that a requestor is requesting;
identifying a group entry in the group RAM corresponding to the requestor that is requesting; and
setting a corresponding group valid field in a corresponding group entry to indicate a requestor in the group is requesting.

10. The method of claim 1 wherein selecting one of the multiple entries in the group RAM comprises;
accessing a group last chosen value to obtain a starting point for selecting one of the groups of requestors in the round robin manner; and
upon selecting one of the multiple entries in the round robin manner, setting the last chosen value to indicate a next starting point.

11. The method of claim 1 wherein selecting one of the groups in a round robin manner further comprises:
accessing a RRAM starting pointer and end pointer for the selected group;
accessing a RRAM last chosen value for the selected group; and
performing the round robin arbitration on entries in the RRAM corresponding to the starting pointer, end pointer, and last chosen value.

12. The method of claim 1 wherein the RRAM is a dedicated RAM.

13. An arbitration system comprising:
a requestor random access memory (RRAM) having multiple entries, each entry corresponding to a requestor and including a valid field indicating whether or not the requestor is requesting;
a group RAM having multiple group entries, each group entry corresponding to a group of requestors and including a group valid field indicating whether or not the group of requestors is requesting, a start pointer to a corresponding to the RRAM, an end pointer to the corresponding RRAM, and a last chosen pointer wherein one of the multiple entries in the group RAM is selectable in a round robin manner as a function of a value in the group valid field indicative of the corresponding group of requestors requesting; and
arbitration circuitry configured to:
receive requests for arbitration between the multiple requestors;
perform round robin arbitration using the group RAM to select one of the multiple entries in the group RAM corresponding to a portion of the RRAM;
access the RRAM to select one of the multiple entries in a round robin manner from the corresponding portion of the RRAM as a function of a value in the valid field indicative of the corresponding requestor requesting; and
send an indication to the corresponding requesting requestor.

14. The system of claim 13 wherein the arbitration is further configured to reset the valid field of the one of the multiple entries following the selecting of the one of the multiple entries.

15. The system of claim 13 wherein the arbitration circuitry is further configured to:
receive an indication that a requestor is requesting;
identify an entry in the RRAM corresponding to the requestor that is requesting; and
setting a corresponding valid field in a corresponding entry to indicate the requestor is requesting.

16. The system of claim 13 and further comprising a last chosen register accessible by the arbitration circuitry and wherein arbitration circuitry is configured to access the RRAM by:
accessing the last chosen register to obtain a starting point for selecting one of the multiple entries in the RRAM in the round robin manner; and
upon selecting one of the multiple entries in a round robin manner, setting the last chosen register to indicate a next starting point.

17. The system of claim 13 wherein the arbitration circuitry is further configured to select one of the multiple entries of the RRAM in a round robin manner by:
- accessing a credit field for each entry; and
- selecting the one of the multiple entries in the RRAM as a function of a credit value in a corresponding credit field in addition to the value in the valid field.

18. The system of claim 13 wherein the arbitration circuitry is further configured to access the RRAM in a pipelined manner to enable a read of an entry every arbitration processor clock cycle.

19. A method comprising:
- receiving arbitration requests at an arbitration processor from multiple requestors;
- performing round robin arbitration for each request using a group RAM having multiple group entries, each group entry corresponding to a group of requestors and including a group valid field indicating whether or not the group of requestors is requesting, a start pointer to a corresponding requestor random access memory (RRAM), an end pointer to the corresponding RRAM, and a last chosen pointer;
- selecting one of the multiple entries in the group RAM in a round robin manner as a function of a value in the group valid field indicative of the corresponding group of requestors requesting;
- sending set valid field request to the RRAM having multiple entries, each entry corresponding to a requestor and including a valid field;
- accessing a portion of the RRAM containing the corresponding group of requestors to select one of the multiple entries in a round robin manner as a function of a value in the valid field indicative of the corresponding requestor requesting;
- resetting the value in the valid field of the selected one of the multiple entries; and
- sending an arbitration done indication to the corresponding requestor.

* * * * *